United States Patent Office 3,058,695
Patented Oct. 16, 1962

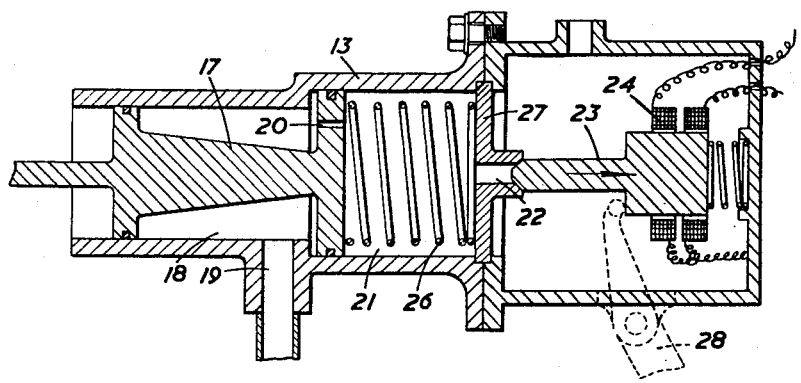

3,058,695
AUXILIARY GAS SUPPLY FROM GAS TURBINE ENGINE AND AIRCRAFT FITTED THEREWITH
Edward Alec Simonis, Kenton, England, assignor to The De Havilland Engine Company Limited, Leavesden, England, a British company
Filed Sept. 3, 1957, Ser. No. 681,611
Claims priority, application Great Britain Sept. 3, 1956
3 Claims. (Cl. 244—42)

This invention relates to apparatus for bleeding a pressurised gas supply from the main working gas stream of a gas turbine engine and feeding this pressurised gas supply to one or more points. The invention is thus particularly applicable to auxiliary gas supply systems in aircraft powered by gas turbine engines where the auxiliary gas supply is used for heating, de-icing, boundary layer control or other purposes.

It is an object of the invention to provide improved apparatus of this type which will itself be safe in operation and will not detract from the safety of operation of the engine or engines.

According to the present invention apparatus of the kind referred to comprises a ducting system including a bleed passage communicating with the plenum of the gas turbine engine and one or more venturi type restrictions, through which at least the major proportion of the bleed gas flows to the delivery point or points.

Preferably the total effective venturi throat area is such that the bleed gas flow is limited to a value which does not cause unsafe overheating of the engine, this value being a predetermined proportion of the total mass flow through the engine.

Because of the low pressure loss of a venturi when passing a gas flow near to its limiting value it is thus possible to operate under normal conditions with any air bleed up to a high proportion of this safe maximum flow and ensure that in the event of any leakage in the ducting or failure of one or more engines feeding into the common duct system the sound engines are safeguarded against excessive bleed with consequent overheating.

The gas will usually be bled in the form of hot compressed air upstream of the combustion chambers.

The invention is particularly applicable to systems supplied with gas from two or more engines, and in such cases preferably includes a common ducting system leading to the delivery point or points with venturi type restrictions in the bleed passages from each engine.

According to a preferred feature of the invention the apparatus includes a closure valve in each of the bleed passages.

In such cases the apparatus will also preferably include a pressure responsive device sensitive to the pressure difference developed across one or more of the venturi restrictions associated with each engine and arranged to close the closure valve if the pressure difference is reversed in direction by more than a predetermined value.

In a preferred embodiment the high pressure tapping for the pressure responsive device is taken from the upstream side of the closure valve in the bleed passage.

Each of the said closure valves may conveniently be operated by an air servo device which draws its operating air from a common duct associated with at least two of the engines.

According to a further aspect of the invention the ducting system communicates with two or more independent delivery passages leading respectively for example to boundary layer control apertures and to de-icing equipment, and including change-over valve mechanism arranged to direct the bleed gas selectively to the required passage or passages, and the change-over valve mechanism may be arranged to give priority to a preferred delivery passage for example, a boundary layer control passage, and to prevent the selection of other valve settings when such passage is in use.

The invention may be performed in various different ways but one specific embodiment will now be described by way of example as applied to an auxiliary air supply system deriving compressed air from two or more gas turbine engines located in an aircraft and supplying air for de-icing and boundary layer control purposes with reference to the accompanying drawings in which:

FIGURE 2 is a sectional view of an air operated servo device used in the system and FIGURE 3 is a sectional view of a pressure operated control switch also used in the system.

Figure 1:
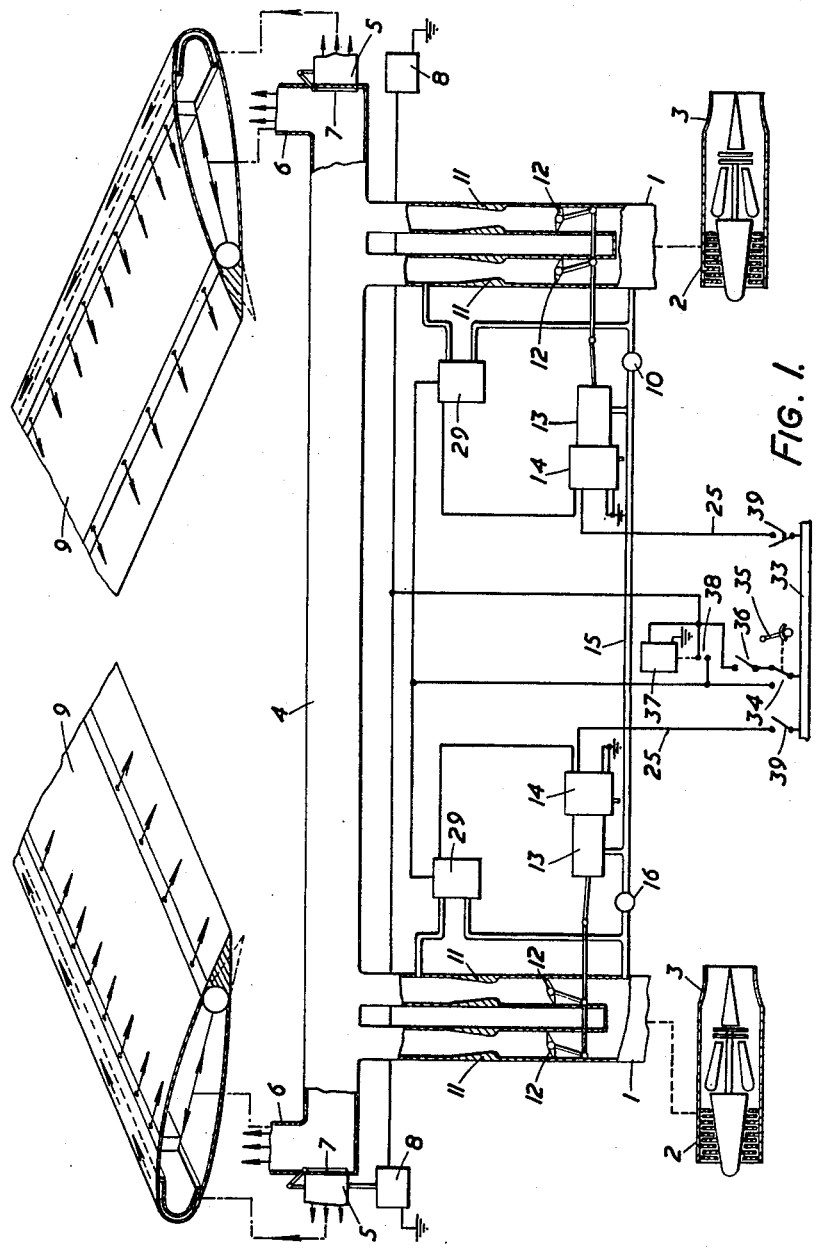
FIGURE 1 is a diagrammatic view showing the general arrangement of the system.

As shown in FIGURE 1 the apparatus comprises a main bleed passage 1 leading from the compressor 2 of each of the two gas turbine engines 3, each passage being divided into two branches which lead into a common manifold 4, at each end of which is connected a pair of delivery ducts 5 and 6 which lead respectively to de-icing and boundary layer control equipment. The two ducts 5 and 6 at each end of the manifold 4 are selectively controlled by a changeover flap valve 7 under the control of a solenoid 8. In this particular example the boundary layer control equipment is arranged to supply pressurised air to the control surfaces of the aircraft, the wing of which is diagrammatically indicated at 9 to increase the aerodynamic lift of these surfaces during take-off and landing. Such equipment is known in itself and is commonly referred to as "flap blowing." The de-icing equipment in this example is applied to the aircraft structure such as the wing surfaces diagrammatically indicated at 9, and not particularly to the engine air intakes for example.

Each of the branches of the bleed passage 1 includes a venturi type restriction 11 and the venturis in each pair of branches associated with one engine are so dimensioned to give a total effective throat area which limits the air flow from each engine to the maximum permissible proportion of the total mass flow through the engine under the most severe engine operating conditions so that the engine is prevented from overheating. The venturi restrictions 11 are so designed to provide a high pressure recovery and it is thus possible to bleed an amount approaching this maximum allowable proportion of air, under all conditions of operation of the engines and enable this air to be available for auxiliary usage at a pressure level approaching that of the air as bled from the engine.

In each of the branches, upstream of the venturi restrictions 11, is arranged a simple butterfly type on/off valve 12, each valve in one pair of branches being operated by an air servo ram indicated at 13 under the control of an associated solenoid servo valve indicated at 14. The air to operate the servo rams 13 is derived from a common pressure line 15 which is connected to both of the bleed passages 1 from the two engines 3 which includes a non-return valve 16 between the respective rams 13 and the bleed passages. Thus the butterfly valves 12 associated with any engine can be closed, even if the air pressure from that engine fails.

As shown in FIGURE 2 each air servo ram 13 may conveniently comprise a spool type ram piston 17 lying in a stepped cylinder 18 the two ends of the piston 17 being of correspondingly different diameters. Pressure air to operate the piston is admitted from the common pressure line 15 through a port 19 in the cylinder wall between the two spool ends of the piston and an aperture 20 in the larger of the ends communicates with the larger diameter end 21 of the cylinder 18 which in turn is connected to relief through a control port 22 closed by a valve spindle 23 which is actuated by a solenoid 24 and forms the solenoid servo valve 14. When the port 22 is closed, i.e. in the position shown in FIGURE 2 the piston is urged to the left by air pressure acting on the differential areas of the piston away from the larger diameter end 21 of the cylinder in a direction to close the butterfly valves 12 in the branch passages. Thus in operation when the solenoid winding is energised to open the control port 22 the pressure difference developed across the larger diameter end of the spool piston 17 causes the piston to open the butterfly valves 12 in the branch passages. Normally the solenoid is energised automatically on selecting boundary layer control air but an emergency circuit 25 is provided to enable the valves to be opened if required in the event of a failure in the main control circuit to be described. A spring 26 is arranged in the larger diameter end 21 of the cylinder between the larger diameter end of the spool piston and a disc 27 in which the control port 22 is formed to maintain the piston and the valves 12 in the closed position when there is no air pressure available, i.e. when both engines are shut down.

An emergency mechanically operated control is also provided in lieu of or in addition to the "flap emergency" circuit 25 to open the control valve in the event of a complete electrical failure and part of the mechanism is shown at 28 in FIGURE 2.

The control mechanism for the system also includes a pressure responsive switch 29 associated with each engine and as shown in FIGURE 3 comprises a diaphragm 30 which is arranged to be acted upon by the pressure on each side of at least one of the venturi restrictors 11 in each pair through a pair of passages 31. Each pressure switch 29 is arranged to open an electrical contact 32 whenever the associated compressor delivery pressure falls by a predetermined amount below the pressure in the manifold 4. The electrical contacts are closed under normal operating and normal air bleed conditions.

The electrical control circuit for the system is tapped from the aircraft's main D.C. supply 33 and includes a main boundary layer control air switch 34 arranged in series with the pressure switch 29 and the windings of the air servo solenoid servo valve 14 associated with each engine. This main switch 34 is conveniently connected to the pilot's flap selecting control 35 in the cockpit of the aircraft so that on selecting flaps the air for flap boundary layer control is automatically supplied without further action on the part of the pilot.

The change-over valves 7 controlling the flow of hot pressurised air from the manifold 4 are each normally urged into a position where the de-icing delivery passages 5 are closed and the boundary layer control passages 6 open. In order to obtain air for de-icing a de-icing selector switch 36 is arranged in the control circuit in series with the change-over valve solenoids 8. It will be appreciated that the arrangement as shown will ensure that when the pilot selects flaps, air is immediately supplied to these controls, even though de-icing air had previously been selected and that it is not possible to select de-icing air when the flaps have been lowered. The de-icing circuit is also connected to a de-icing relay 37 which when energised by closure of the de-icing selector switch 36 closes an electrical contact 38 connecting the boundary layer control and de-icing control circuits, on the ground side of the switch. Thus the windings of the air ram servo 14 are energised from the de-icing circuit even though the main boundary layer control switch 34 is open.

As mentioned above the air ram servos are arranged to move the butterfly valves 12 into the closed position when the solenoids 24 are disconnected and this will happen if there is a failure for example in either of the main control circuits. To ensure that the pilot can still obtain air for flap boundary layer control under these conditions however an additional flap emergency control circuit 25 with an emergency flap control switch 39 is provided from the aircraft's main D.C. supply in series with the winding on the air servo control valves 14 for each engine.

When air for boundary layer control or anti-icing is bled from an engine upstream of the turbine it may be necessary to make datum changes to the speed and/or maximum temperature and/or acceleration controls in order to maintain safe operation of the engine. These would be effected by direct selection, or the closing of the air ram servo solenoid circuit may be arranged to energise further solenoid switches or relays, or alternatively the pressure at some convenient point in the ducting downstream of the on/off valves—preferably between these valves and the venturi restrictions—could be utilised on diaphragms or pistons, to make the necessary changes automatically.

What I claim as my invention and desire to secure by Letters Patent is:

1. An aircraft having two fixed wings and a pair of nozzles, one in each wing extending in the direction of the wing span, the pair being symmetrically positioned in relation to the aircraft for projecting hot gas rearwardly over the surface of the wing for air flow control, at least two gas turbine engines, each of which comprises a compressor, a combustion chamber and an exhaust gas driven turbine coupled to the compressor, and a casing defining a main working gas flow passage through the compressor, combustion chamber and turbine, a common hot gas duct, a pair of delivery passages each providing communication between the common hot gas duct and one of the nozzles, a bleed passage connected to each engine communicating at one end with the main working gas flow passage of each engine, and at the other end with the common hot gas duct at a point between the two delivery passages, a venturi restriction in each bleed passage which restricts the gas flow therethrough to a predetermined proportion of the total flow through the working gas flow passage to which it is connected, a closure valve in each bleed passage, and means responsive to the pressure difference across said venturi restriction between the pressure in the common hot gas duct and the pressure on the engine side of each valve for closing said valve when the pressure in the hot gas duct exceeds the pressure on the engine side of the valve by more than a predetermined value.

2. An aircraft as claimed in claim 1 having a pair of flaps arranged symmetrically, one in each wing, and in which the nozzles are positioned to project hot gas over the surfaces of the flaps.

3. An aircraft as claimed in claim 2 including mechanism for lowering the flaps and automatic means for causing the projection of hot gas over the flap surfaces to commence when the flaps are lowered.

References Cited in the file of this patent

UNITED STATES PATENTS

| | | |
|---|---|---|
| 2,277,175 | Wagner | Mar. 24, 1942 |
| 2,427,972 | Melchior | Sept. 23, 1947 |
| 2,447,408 | Griswold | Aug. 17, 1948 |
| 2,474,441 | Sparrow | June 28, 1949 |
| 2,515,519 | Lawrence | July 18, 1950 |
| 2,520,697 | Mac L. Smith | Aug. 29, 1950 |
| 2,563,054 | Messinger et al. | Aug. 7, 1951 |
| 2,704,922 | Cruckshank | Mar. 29, 1955 |
| 2,720,356 | Erwin | Oct. 11, 1955 |
| 2,734,585 | Ball et al. | Feb. 14, 1956 |
| 2,886,968 | Johnson et al. | May 19, 1959 |

FOREIGN PATENTS

| | | |
|---|---|---|
| 292,552 | Great Britain | Jan. 3, 1929 |
| 745,905 | Great Britain | Mar. 7, 1956 |